(12) United States Patent
Samdahl et al.

(10) Patent No.: US 9,381,433 B2
(45) Date of Patent: Jul. 5, 2016

(54) INTERACTIVE ROLE-PLAY AND SOCIAL GAMING SYSTEM

(75) Inventors: Amber Samdahl, La Canada Flintridge, CA (US); Jeffrey Voris, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 534 days.

(21) Appl. No.: 13/568,054

(22) Filed: Aug. 6, 2012

(65) Prior Publication Data

US 2014/0038723 A1    Feb. 6, 2014

(51) Int. Cl.
| | |
|---|---|
| *A63F 9/24* | (2006.01) |
| *A63F 13/30* | (2014.01) |
| *A63F 13/216* | (2014.01) |
| *A63F 13/217* | (2014.01) |
| *A63F 13/795* | (2014.01) |
| *A63F 13/798* | (2014.01) |

(52) U.S. Cl.
CPC ............... *A63F 13/12* (2013.01); *A63F 13/216* (2014.09); *A63F 13/217* (2014.09); *A63F 13/30* (2014.09); *A63F 13/795* (2014.09); *A63F 13/798* (2014.09)

(58) Field of Classification Search
CPC .... A63F 13/00; A63F 13/795; A63F 2300/69
USPC .......................................................... 463/42
See application file for complete search history.

(56) References Cited

U.S. PATENT DOCUMENTS

| | | | |
|---|---|---|---|
| 2002/0090985 A1* | 7/2002 | Tochner et al. | 463/1 |
| 2006/0293103 A1* | 12/2006 | Mendelsohn | 463/42 |
| 2010/0063854 A1* | 3/2010 | Purvis et al. | 705/5 |
| 2011/0281638 A1* | 11/2011 | Bansi et al. | 463/23 |
| 2012/0015739 A1* | 1/2012 | Craine et al. | 463/42 |

* cited by examiner

*Primary Examiner* — Masud Ahmed
(74) *Attorney, Agent, or Firm* — Patent Ingenuity, P.C.; Samuel K. Simpson

(57) ABSTRACT

A role-play module that monitors a social networking platform receives an indication of a game event from a first player located in a physical environment where a role-play game is conducted. The first player has a first role in the role-play game. Further, the role-play module provides the indication to the social networking platform such that the social networking platform provides the indication to a second player remotely situated from the physical environment. The second player has a second role in the role-play game. In addition, the role-play module asynchronously receives, from the second player, an instruction for an action to be performed by the first player in the role-play game. The role-play module also provides the instruction to the social networking platform such that the social networking platform provides the instruction to the first player.

30 Claims, 8 Drawing Sheets

INTERACTIVE ROLE-PLAY AND SOCIAL GAMING SYSTEM

BACKGROUND

1. Field

This disclosure generally relates to the field of computer systems. More particularly, the disclosure relates to social networking.

2. General Background

Some social networking systems allow players to interact with each other to play online games. For example, users may remotely collaborate in playing an online game. An online game involves a set of rules according to which a player interacts with a computerized system and/or another player. The player is typically challenged during the online game to perform a task. Player interactions that take place in a game context are different from many other types of interactions (e.g., commercial transactions, email communications, emergency notifications and the like) in that games may tolerate uncertain or unreliable message delivery, delayed message delivery, and the like. It is believed that improvements in conventional messaging systems are needed to better support the gaming environment.

Separately, some live action role-playing ("LARP") experiences allow players to role-play in a role-play game in the physical world. As an example, an amusement park may provide a role-play experience that includes performers interacting with guests throughout different locations in the amusement park. Guests may want to interact with others such as their friends who are not present in the physical role-play game so that those friends may also enjoy the role-pay game experience. Conventional messaging systems are designed primarily for reliable, asynchronous communication and as such are not adapted for casual, substantially synchronous interaction that would be desirable in a role-play game. For example, friends of the role-play game participants may not be available to provide input at the time that the role-play game participants are playing the role-play game in the physical world. Accordingly, the role-play game participant may send a message that may not be read until the role-play game participant has progressed through later parts of the role-play game or possibly even finished the role-play game. It is believed that improvements in conventional messaging systems are needed to better support LARP experiences.

SUMMARY

In one aspect of the disclosure, a computer program product is described. The computer program product includes a computer readable medium having a computer readable program stored thereon. The computer readable program while executing on a computer causes the computer to receive, at a role-play module that monitors a social networking platform, an indication of a game event from a first player located in a physical environment where a role-play game is conducted. The first player has a first role in the role-play game. Further, the computer readable program while executing on the computer causes the computer to provide the indication from the role-play module to the social networking platform. The social networking platform provides the indication to a second player remotely situated from the physical environment. The second player has a second role in the role-play game. In addition, the computer readable program while executing on the computer causes the computer to asynchronously receive, from the second player at the role-play module, an instruction for an action to be performed by the first player in the role-play game. The computer readable program while executing on the computer also causes the computer to provide the instruction to the first player.

In another aspect of the disclosure, a process is described. The process receives, at a role-play module that monitors a social networking platform, an indication of a game event from a first player located in a physical environment where a role-play game is conducted. The first player has a first role in the role-play game. Further, the process provides the indication from the role-play module to the social networking platform. The social networking platform provides the indication to a second player remotely situated from the physical environment. The second player has a second role in the role-play game. In addition, the process asynchronously receives, from the second player at the role-play module, an instruction for an action to be performed by the first player in the role-play game. The process also provides the instruction to the social networking platform provides the instruction to the first player.

In yet another aspect of the disclosure, a system is described. The system comprises a processor configured to receive, at a role-play module that monitors a social networking platform, an indication of a game event from a first player located in a physical environment where a role-play game is conducted. The role-play module provides the indication to the social networking platform and the social networking platform provides the indication to a second player remotely situated from the physical environment. The system is further configured to asynchronously receive, from the second player, an instruction for an action to be performed by the first player in the role-play game, and provide the instruction to the first player.

In another aspect of the disclosure, a computer program product is described. The computer program product includes a computer readable medium having a computer readable program stored thereon. The computer readable program while executing on a computer causes the computer to receive, at a role-play module that monitors a social networking platform, an indication of a game event from a first player located in a physical environment where a role-play game is conducted. The first player has a first role in the role-play game. Further, the computer readable program while executing on the computer causes the computer to provide the indication from the role-play module to the social networking platform and the social networking platform provides the indication to a second player remotely situated from the physical environment. The second player has a second role in the role-play game. In addition, the computer readable program while executing on the computer causes the computer to asynchronously receive, from the second player, a set of data associated with the role-play game. The computer readable program when executed on the computer also causes the computer to generate, at the role-play module, an instruction based upon the set of data. Further, the computer readable program while executing on the computer causes the computer to provide the instruction to the social networking platform such that the social networking platform provides the instruction to the first player.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A system may be utilized to provide both an interactive role-play experience in a physical environment and an interactive experience in a remote location. The system allows participants in a role-play game in a physical environment to asynchronously collaborate with their personal social network of friends, family, and/or the like, who are in physical locations remote from the physical environment. As an example, a role-play game participant in an amusement park may interact with a role-play game participant in a remote location through a social network platform. In one aspect, a module may be connected to a social network platform that allows both the role-play game participant in the physical environment of the role-play game and the role-play game participant that is located remotely from the physical environment of the role-play game to interact.

Figure 1:
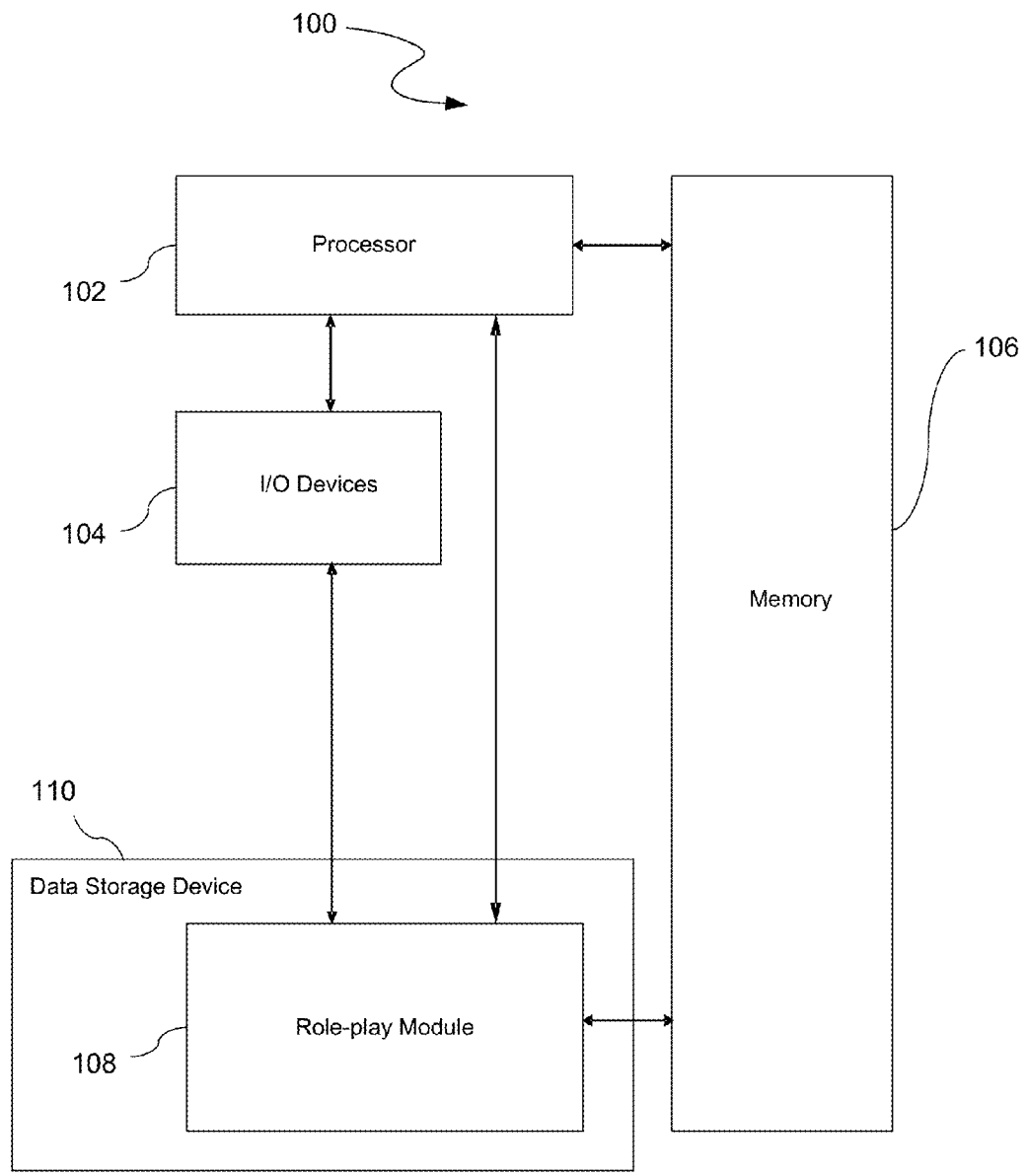
FIG. 1 illustrates a system that may be utilized to provide the interactive role-play experience in a physical environment and an interactive experience in a remote location.

FIG. 1 illustrates a system 100 that may be utilized to provide the interactive role-play experience in a physical environment and an interactive experience in a remote location. In one aspect, the system 100 is implemented utilizing a general purpose computer or any other hardware equivalents. As illustrated, the system 100 comprises a processor 102, a memory 106, e.g., random access memory ("RAM") and/or read only memory (ROM), a role-play module 108 that provides role-play interactivity between a user in the physical environment and a user in a remote location, a data storage device 110 that stores the role-play module 108, and various input/output devices 104, (e.g., audio/video outputs and audio/video inputs, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)). In one aspect, the role-play module 108 is implemented as a software module and is stored in the data storage device 110. The software module may be a software application such as a mobile application, a desktop application, a web application, or the like. Further, the role-play module 108 may have its own Application Programming Interface ("API") that may be utilized to interact with other software components or may utilize the APIs of other software components for interaction. The role-play module 108 may include a logic controller/rules engine, sets of gameplay rules, mobile app(s), social networking app(s), interfaces to SMS, databases of users/user actions/game state, or the like. In one aspect, the software module is loaded from a storage medium, (e.g., a magnetic or optical drive, diskette, or non-volatile memory) and operated by the processor 102 in the memory 106 of the system 100. As such, the role-play module 108 (including associated data structures) of the present disclosure may be stored on a computer readable medium, e.g., RAM memory, magnetic or optical drive or diskette or the like. Various other configurations for the role-play module 108 may be utilized such as firmware stored in a persistent implementation of the memory 106, a hardware implementation having one or more physical devices that are coupled to the processor 102, or a hardware implementation where the processor 102 performs the role-play functionality.

Alternatively, the role-play functionality may be implemented in an integrated software system rather than a modular set of software code. In other words, the role-play functionality may be implemented throughout a variety of different system components.

Figure 2:
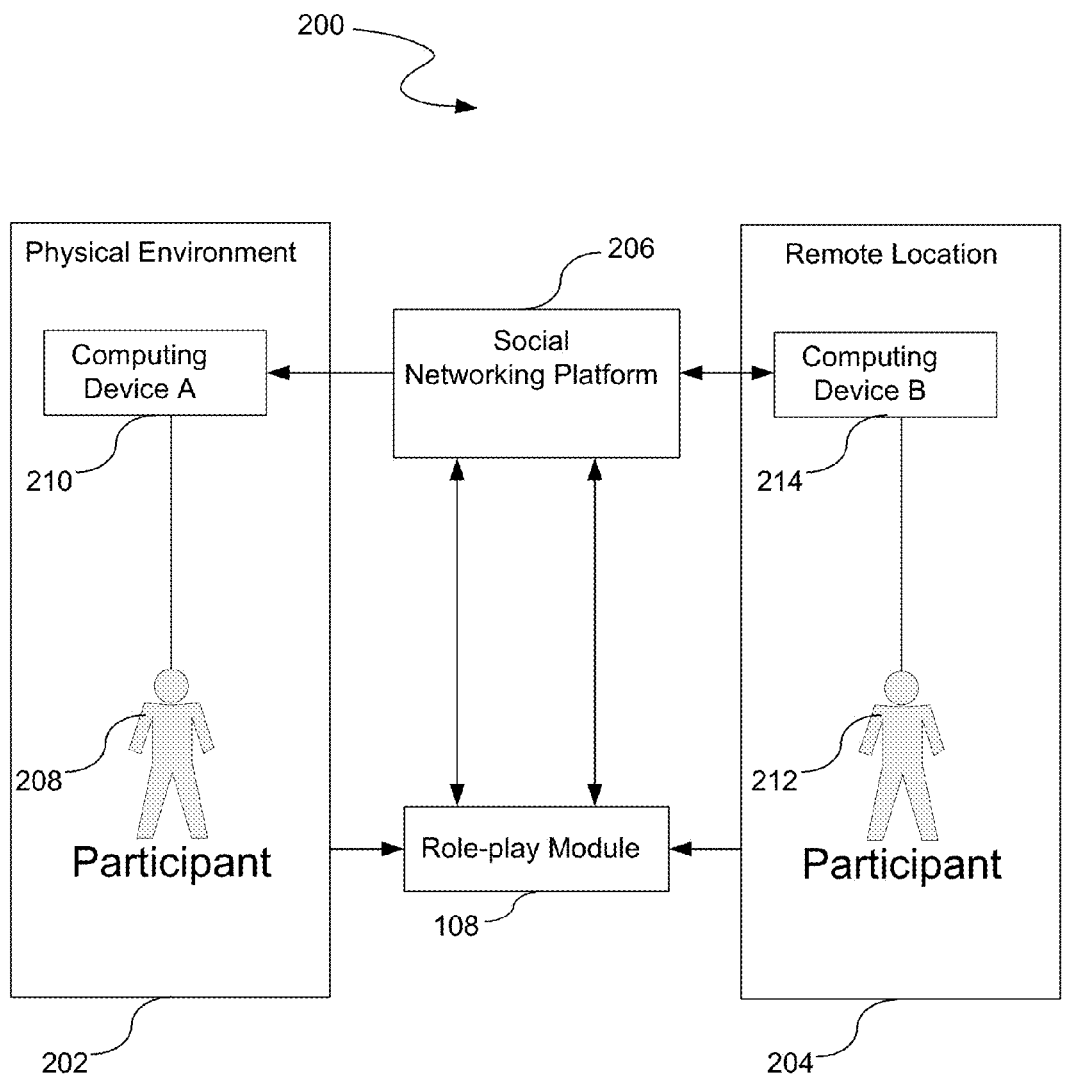
FIG. 2 illustrates a system that provides a role-play gaming experience.

FIG. 2 illustrates a system 200 that provides a role-play gaming experience. The system 200 includes a physical environment 202, a remote location 204, and a social networking platform 206. The physical environment 202 may be an amusement park, theme park, recreation area, non-entertainment area, home, or like physical locations. Further, one or more participants 208 are situated in the physical environment 202. For example, a participant 208 is situated in the physical environment 202. Further, the participant 208 is utilizing a computing device 210. The computing device 210 may be a personal computer ("PC"), laptop, smartphone, tablet device, set top box, or the like; a device that implements a user interface enabling interaction with participant 208 and computing resources configured to implement behaviors and functions described herein is suitable for implementation of device 210. As an example, the participant 208 may be playing a role (e.g., a detective, a victim, a witness, etc.) in a role-play game (e.g., a crime investigation game) in an amusement park. The remote location 204 is a location that is separated by physical distance from the physical environment 202. Further, one or more participants in the role-play game may be situated in the remote location 204. For example, a participant 212 is situated in the remote location 204. The participant 212 is a friend, contact, follower, or the like, of the participant 208 as defined by the social networking platform 206. As an example, the participant 208 may be playing the role of a detective that requests his or her friend, e.g., the participant 212, to play the role-play game with him or her whereas the participant 212 may be a researcher that assists the detective. As a result, the participant 208 may be able to better enjoy the role-play game by having his or her friend participate in the role-play game even though his or her friend is not also situated in the physical environment 202.

Platforms other than the social networking platform 206 may be utilized with the system 200. A platform such as a social network, a voice based communication system, an SMS system, or other communication system that allows users to interact with each other may be utilized with the system 200.

The social networking platform 206 interacts with the role-play module 108. The participant 208 utilizes his or her computing device 210 to interact with the social networking platform 206. Further, the participant 212 may utilize his or computing device 214 to interact with the role-play module 108 through the social networking platform 206. The participant 212 may also interact directly with the social networking platform 206. The role-play module 108 may interact with the social networking platform 206 to monitor the interactions that the participant 208 and the participant 212 have with the social networking platform 206. Based upon such monitoring, the role-play module may then generate role-play game communications and/or instructions between the participant 208 and the participant 212 for the role-play game.

As an example, the participant 208 may post a message to the social networking platform 206 through the role-play module 108 that he or she has arrived at a particular location in an amusement park. The role-play module 108 may forward that message to the participant 212 so that the participant 212 is aware of the location of the participant 208. Further, the role-play module 108 may generate a role-play game task for the participant 212 based upon the location of the participant 208 in the amusement park. For example, the role-play module 108 may instruct the participant 212 to solve a puzzle that will help determine a clue for a task that the participant 208 has to complete in the amusement park as part of the role-play game. The participant 212 may then communicate with the participant 208 through the social networking platform 206 by providing a message to the role-play module 108 that may be forwarded to the participant 208 through the social networking platform 206.

In one aspect, the role-play module 108 interacts with the social networking platform 206 through an API of the social networking platform 206. In other words, the role-play module 108 utilizes a communication protocol that is understandable by the social networking platform 206 to interact with the social networking platform 206.

The role-play module 108 allows the participant 208 and the participant 212 to access data and functionality pertaining to the role-play game through the social networking platform 206. In other words, the participants may play certain features of the role-play game through the role-play module 108. For example, each participant 208/212 may access a web page through his or her social networking account that provides role-play features of the role-play game. For instance, the role-play module 108 may instruct the participant 208 to perform a task in the physical environment 202 and the participant 212 to perform a task that may be performed remotely from the physical environment 202. For instance, the participant 208 may be instructed to move to a particular location within the physical environment 202 whereas the participant 212 may be instructed to perform an online puzzle to find a clue that may assists the participant 208 in the physical environment 202.

In yet another aspect, the role-play module 108 may access the user profiles of the participants. A user profile may be created and stored by the social networking platform 206 and contains information such as interests, previous games played, player game statistics, or the like. The role-play module 108 may utilize the user profiles to customize the role-play gaming experience for both the participants in the physical environment 202 and the participants in the remote location 204. For example, the user profile of the participant 208 may indicate that the participant 208 enjoys walking. Accordingly, the role-play module 108 may customize the role-play gaming experience of the participant 208 to include tasks that involve walking to various locations. As another example, the user profile of the participant 212 may indicate that the participant 212 enjoys puzzles. Accordingly, the role-play module 108 may customize the role-play gaming experience of the participant 212 to include puzzles.

The participant 212 provides an instruction to the participant 208 for an action to be performed by the participant 208. The participant 212 may instruct the participant 208 to move to a different location in the physical environment 202 based upon a clue found by the participant 212 by solving a puzzle. The instruction is asynchronously received by the participant 208 from the participant 212. The term asynchronous is herein defined to mean that there may be a time lag between interactions. The participant 208 does not have to perform the instructions received from the participant 212 in order for game play to proceed. In other words, the participant 208 is not prevented from continuing the role-play game based upon whether or not the instruction was provided by remote participant 212. The participant 208 may have received instruction from multiple other remote participants 212 and may choose which to follow. In yet another aspect, the participant 208 does have to perform the instructions received from the participant 212 before being allowed to transition game states. In other words, performance of the instruction received by the participant 208 from the participant 212 is a condition to transitioning game states in the role-play game.

In another aspect, the role-play module 108 dynamically adjusts play of the role-play game based upon the interaction with the participants. For example, if the participant 208 is performing tasks in the physical environment 202 too quickly, the role-play module 108 may adjust the tasks in the physical environment 202 to make the tasks more complex. As another example, if the participant 212 is solving online puzzles too quickly, the role-play module 108 may adjust the online puzzles to make the online puzzles more complex. Further, the role-play module 108 may adjust the tasks of either or both participants based upon the interaction between the participants. If the participant 208 is not completing tasks provided by the participant 212 quickly, the role-play module 108 may increase the complexity of the tasks performed by the participant 212 to decrease the rate at which the participant 212 is sending instructions to the participant 208.

In another implementation, the role-play module 108 may be an application that is downloaded by each participant to his or her computing device 210/214. The role-play module 108 in such instance may be configured to function with the social networking platform 206.

Figure 3:
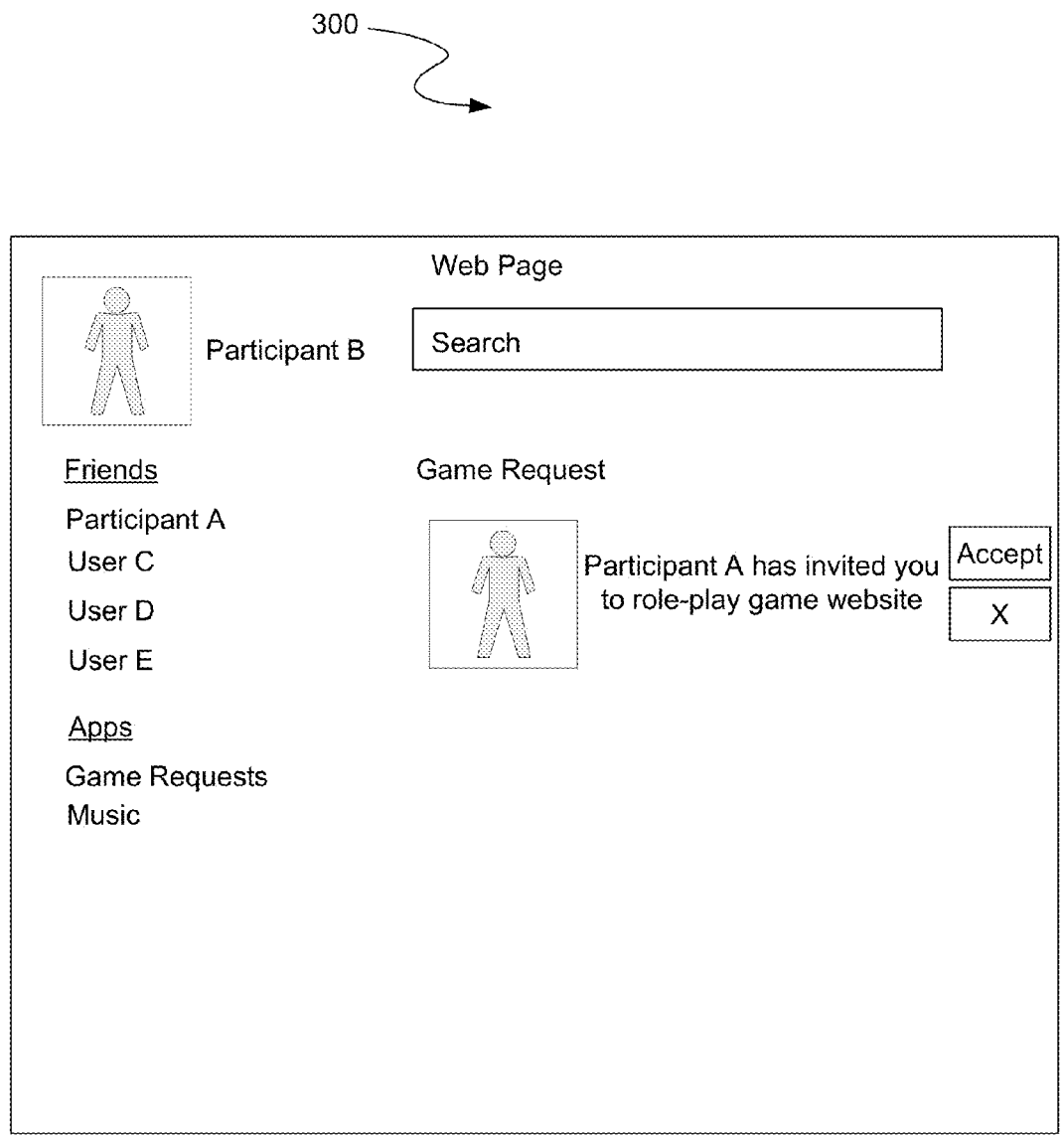
FIG. 3 illustrates an example of a web page that may be utilized by a participant to access a role-play gaming feature.

FIG. 3 illustrates an example of a user interface 300 that may be utilized by a participant to access a role-play gaming feature. For example, the user interface 300 may be a web page that is displayed when the participant 212 illustrated in FIG. 2 accesses his or her account stored by the social networking platform 206 illustrated in FIG. 2. User interface 300 may display a list, e.g., text, links, or the like, of friends such as the participant 208 illustrated in FIG. 2, user C, user D, and user E. Further, the user interface 300 may display various applications such as game requests, music, and/or the like so that the participant 208 may access game requests provided by the role-play module 108 in addition to applications that do not communicate with the role-play module 108. As an example, a game request may be received by the participant 212 from the participant 208 to play in the role-play game. The participant 212 may accept or deny such request by providing an input to the user interface 300. If such request is accepted by the participant 212, a role-play game application may be utilized by the participant 212 to remotely participate in the role-play game.

Figure 4A:
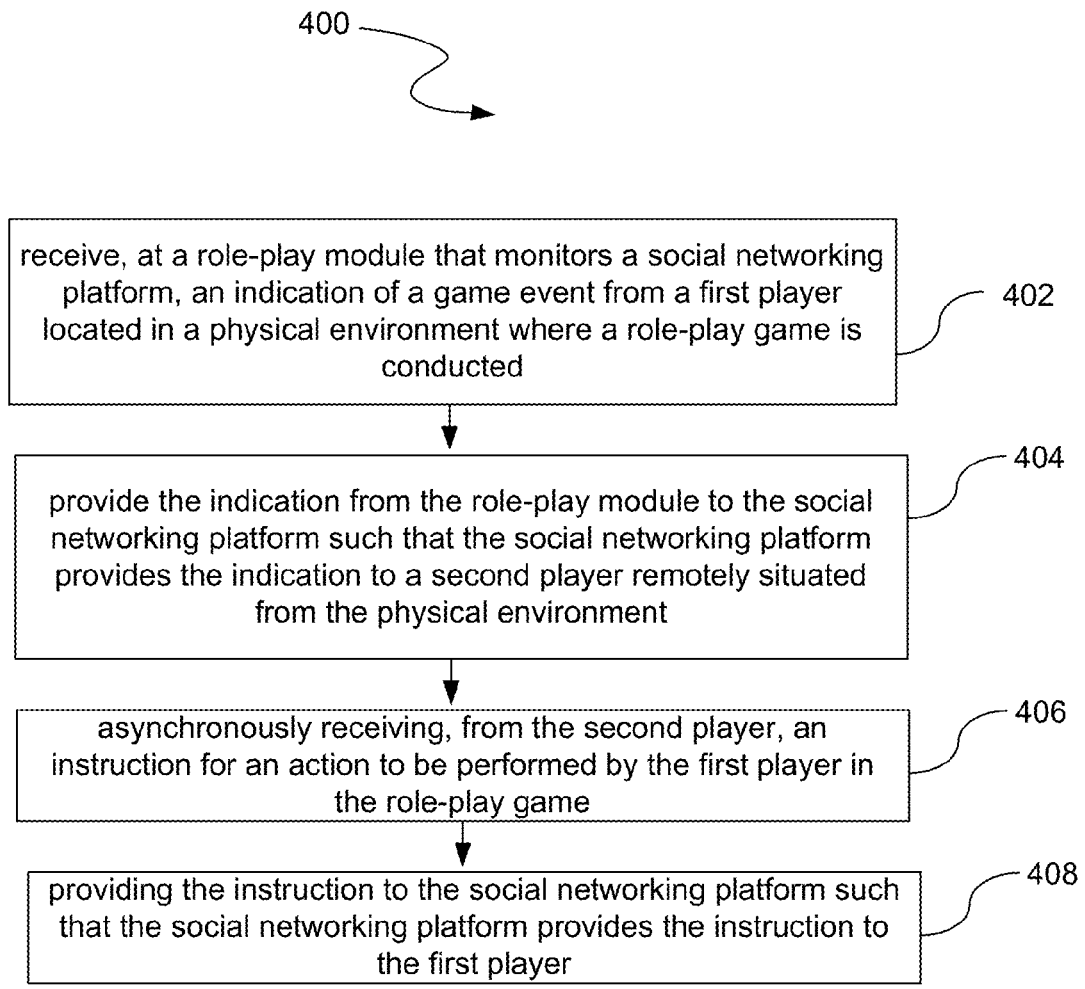
FIG. 4A illustrates a process that may be utilized by the role-play module illustrated in FIGS. 1 and 2 to provide a role-play gaming experience.

FIG. 4A illustrates a process 400 that may be utilized by the role-play module 108 illustrated in FIGS. 1 and 2 to provide a role-play gaming experience. As shown at 402, the process 400 receives, at a role-play module 108 that monitors a social networking platform 206, an indication of a game event from a first player located in a physical environment where a role-play game is conducted. As shown at 404, an indication from the role-play module 108 to the social networking platform 206 is provided such that the social networking platform 206 provides the indication to a second player remotely situated from the physical environment. At 406, the role-play module 108 asynchronously receives an instruction from the second player at the role-play module. The instruction relates to an action to be performed by the first player in the role-play game. At 408, the process 400 provides the instruction to the social networking platform 206 such that the social networking platform 206 provides the instruction to the first player.

Figure 4B:
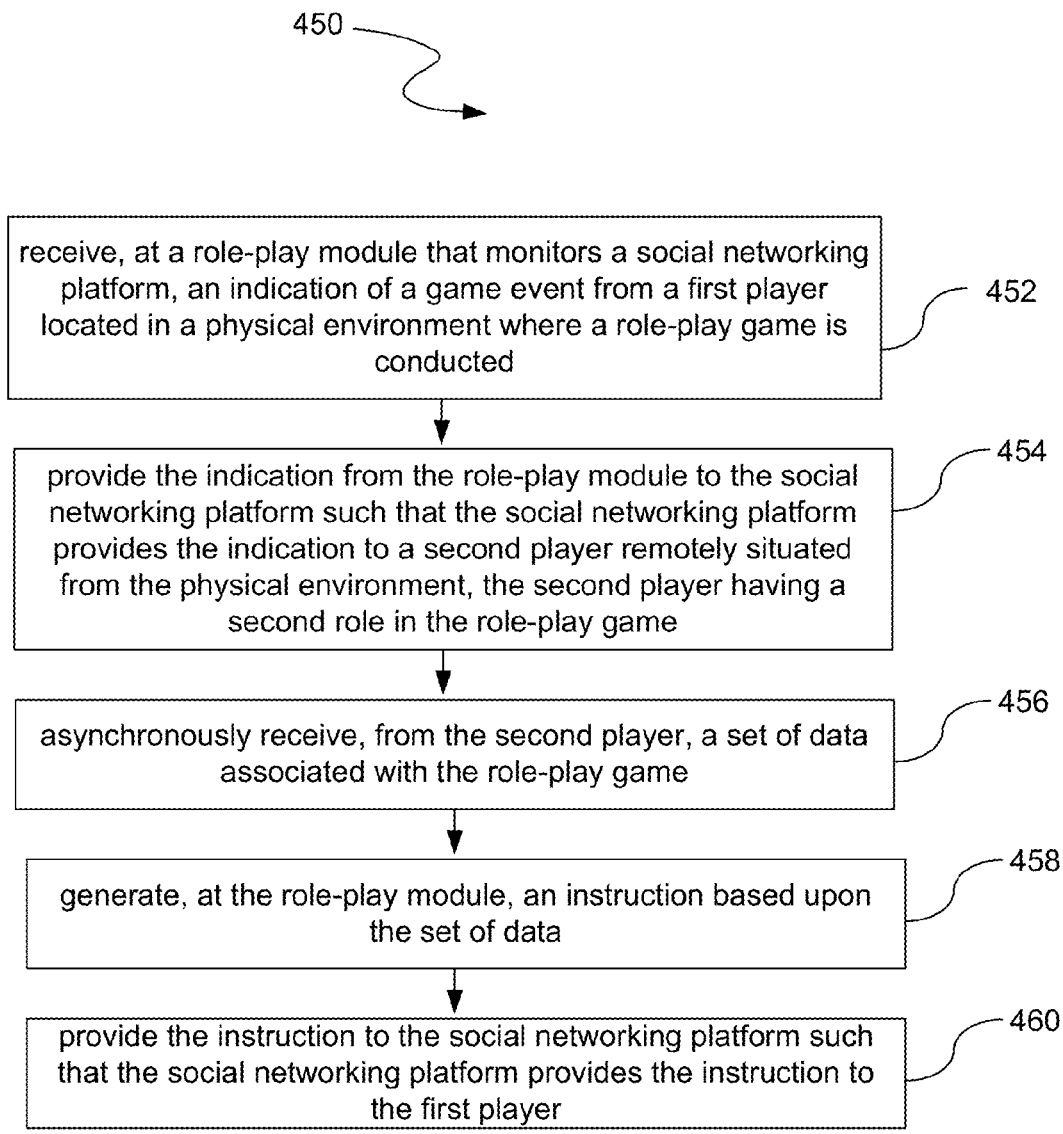
FIG. 4B illustrates an alternative process that may be utilized by the role-play module illustrated in FIGS. 1 and 2 to provide a role-play gaming experience.

FIG. 4B illustrates an alternative process 450 that may be utilized by the role-play module 108 illustrated in FIGS. 1 and 2 to provide a role-play gaming experience. At 452, role-play module 108 receives an indication of a game event from a first player located in a physical environment where a role-play game is conducted. At 454, an indication is provided from the role-play module 108 to the social networking platform 206 such that the social networking platform 206 provides the indication to a second player remotely situated from the physical environment. At 456, role-play module 108 asynchronously receives, from the second player module, a set of data associated with the role-play game. The set of data may be text, media content, pictures, videos, sounds, or the like. At 458, the role-play module 108 generates an instruction based upon the set of data. Further, at 460, role-play module 108 provides the instruction to the social networking platform such that the social networking platform provides the instruction to the first player.

At 402, role-play module 108 receives, from a first player located in a physical environment where a role-play game is conducted, an indication of a game event. Further, at 404, role-play module 108 provides the indication through a social network to a second player remotely situated from the physical environment. In addition, at 406, role-play module 108 asynchronously receives, from the second player through the social network, an instruction for an action to be performed by the first player in the role-play game. At 408, role-play module 108 provides the instruction to the first player.

The participant in the physical environment may manually select a friend on the social networking platform 206 to request to play in the role-play game. Alternatively, a contextual availability ranking system may be utilized to automatically or semi-automatically perform or aid in the selection of select a friend of the participant in the physical environment 202 on the social networking platform 206 to assign a task in the role-play game. For example, the participant in the physical environment 202 may want to get immediate assistance from a friend. The participant in the physical environment 202 may avoid having to manually attempt to request participation from friends that may be unavailable.

Figure 5:
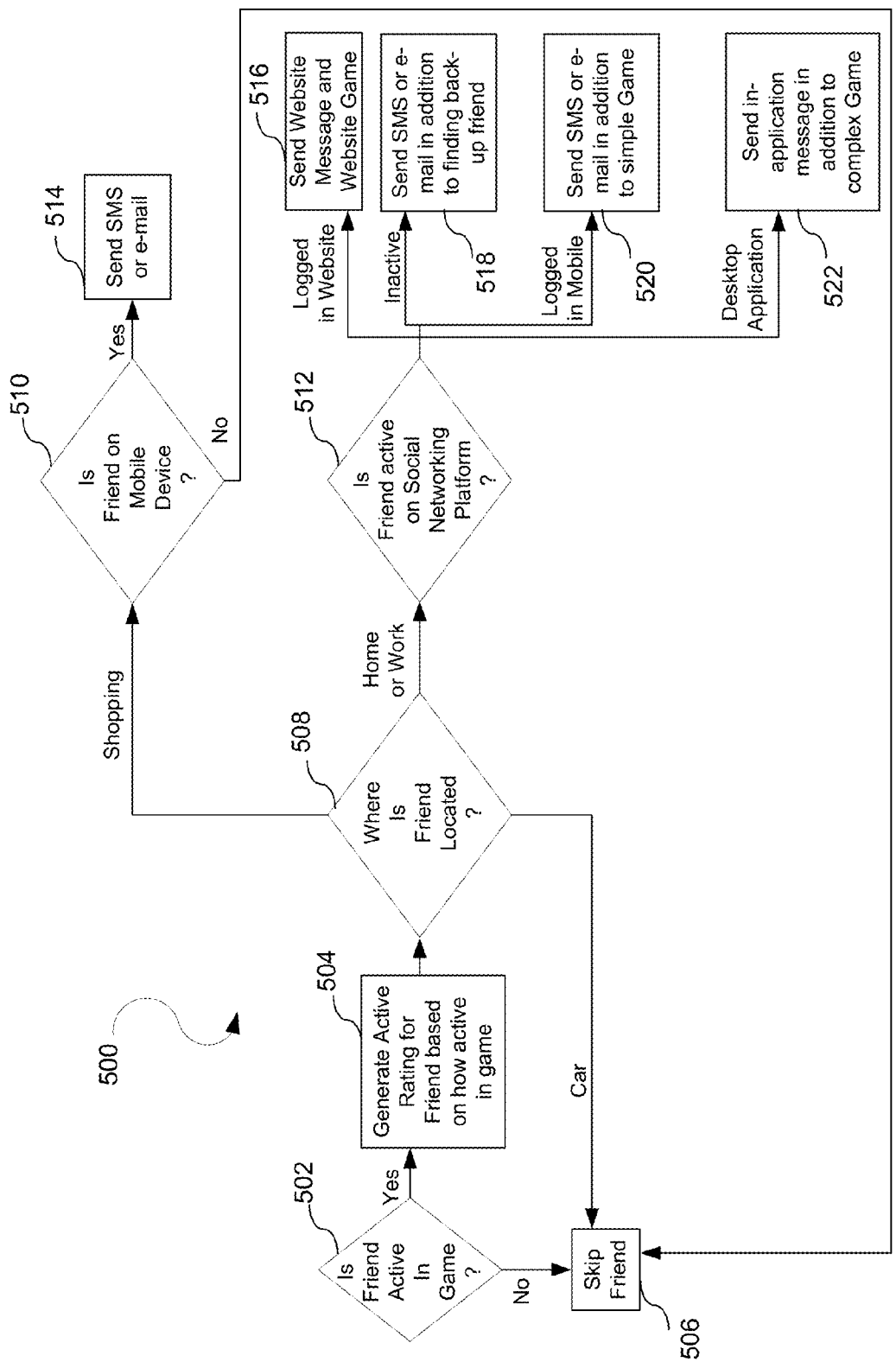
FIG. 5 illustrates a contextual availability ranking flow chart.

FIG. 5 illustrates a contextual availability ranking flow chart 500. Contextual availability is the availability of a person to participate in an activity that is determined based upon a current context of the user. For example, the contextual availability of a person that is sitting at a desk for playing an online game with another user may be higher than the contextual availability of a person that is running for playing the online game with that other user.

The contextual availability ranking flow chart 500 dynamically determines the type of experience or communication that a friend receives. For example, if a friend is at home, the friend may get a longer message and a more complex game that may be accessed from a home computer whereas a friend who is shopping may receive a simpler and quicker interaction message via a messaging service such as short message service ("SMS").

The contextual availability ranking configuration 500 may perform an analysis regarding the contextual availability of different friends of the participant on the social networking platform 206 illustrated in FIG. 2. As an example, at decision block 502 it is determined whether a particular friend is active in a game such as the role-play game. If the friend is active, an active rating is generated for the friend at 504 based on how active the friend is in the role-play game. For example, a high rating may be provided if the friend plays the role-play game hourly whereas a low rating may be provided if the friend plays the role-play game monthly. If the friend is not active block 506 skips the particular friend. Other friends may then be analyzed.

Decision block 508 determines where the friend is located. If the friend is shopping decision block 510 determines whether the friend is on a mobile device. If the friend is on a mobile device an SMS or e-mail is sent to that particular friend at 514. If the friend is not on a mobile device, the contextual availability ranking configuration 500 proceeds to the block 506 to skip the particular friend. Other friends may then be analyzed.

Decision 512 determines if the friend is active on a social networking platform if the friend is located at work or home. An SMS or e-mail is sent at 516 with a link to a website game if the friend is logged into the website. As a result, the friend is alerted to a game request that may be time sensitive. Otherwise, the friend may not become aware of the game request in time to participate in the game. Alternatively based on the result of decision 512, an SMS or e-mail is sent at 518 in addition to finding a back-up friend if the friend is inactive. As another alternative based on the decision in 512, an SMS or e-mail may be sent in addition to a simple game at 520 if the friend is logged in through a mobile device. As yet another alternative from the decision in 512, an in-application message may be sent at 522 in addition to a complex game if the friend is utilizing a desktop application.

The example provided in FIG. 5 is provided merely for illustrative purposes. The contextual availability ranking configuration 500 may be utilized with different decision blocks, different action blocks, and/or the like to meet the needs of a particular application. In other words, different decisions and/or actions may be utilized so long as the functions and behaviors described herein are implemented in a manner substantially equivalent to the description herein.

The contextual availability ranking configuration 500 may be utilized to select a friend of a participant in the physical environment 202 to also have a role in the role-play gaming experience or to assign a task in the role-play gaming experience. The friend may interact remotely. The selection of that friend is based on a ranking that is generated according to analyzing each friend from a group of friends on the social networking platform 206 illustrated in FIG. 2 with the contextual availability ranking configuration 500. The various data gathered also helps determine the level of interaction that the friend may have in the role-play game experience. The friend may be in a location and have a device where he or she may perform more complex actions than if he or she was in a different location with a different device.

In one alternative, the contextual availability ranking configuration 500 selects which friend to communicated with based on a ranking of the availability of friends from a group of friends. In another aspect, the contextual availability ranking configuration 500 determines the most optimal method of communication based on contextual factors. In yet another aspect, the contextual availability ranking configuration 500 determines the content of the communication based on contextual factors.

Figure 6:
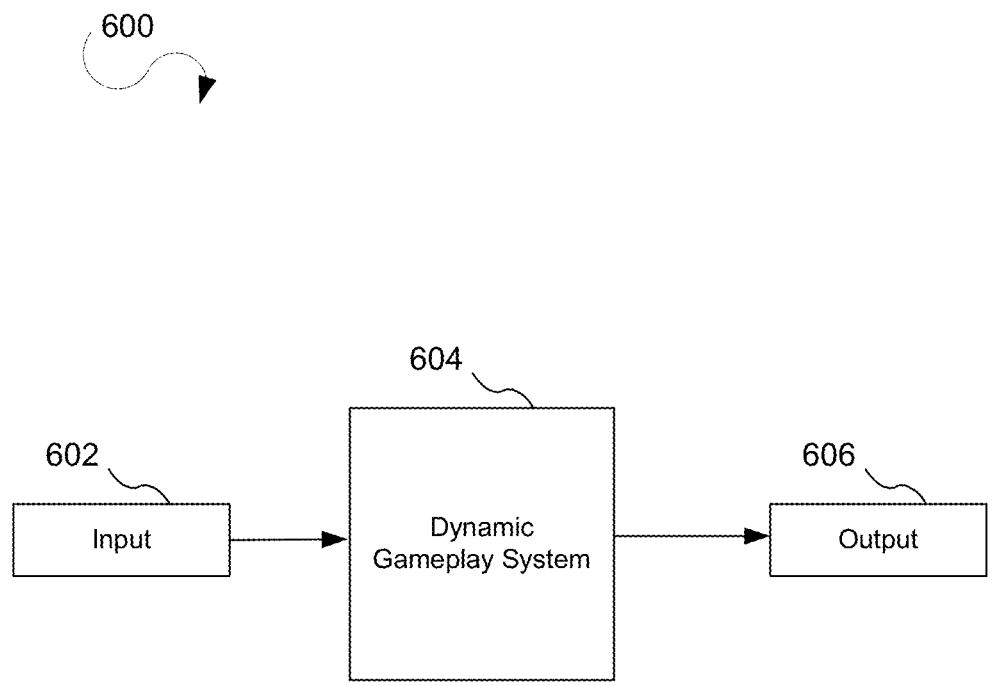
FIG. 6 illustrates a rerouting system.

In another alternative, game play of the role-play game may be dynamically rerouted based upon an automatic determination of external factors. FIG. 6 illustrates a rerouting system 600. The rerouting system 600 includes an input 602. The input 602 may be gathered from a variety of sources including various devices, instruments, and/or systems such as a thermometer, hygrometer, sound level meter, monitoring system, or the like. Alternatively or in addition, input 602 includes actual, estimated, and/or forecast data such as park attendance, guest flow, environmental temperature, precipitation, events, status, audio levels, or the like. The dynamic gameplay system 604 may then utilize the input 602 to automatically determine whether or not gameplay should be rerouted. Accordingly, the gameplay system 604 may output the decision as an output 606. The output 606 may be a signal or a message that indicates a yes or no decision with respect to rerouting. The output 606 may also include a new location to which the role-play game should be rerouted. The output 606 may be provided to one or more display systems that provide the rerouting information to role-play game personnel to direct movement of the role-play game participants. Alternatively, the output 606 may be provided to one or more display systems that provide the rerouting information directly to the role-play game participants.

In one embodiment, the rerouting system 600 may be a subsystem of the role-play module 108. In another embodiment, the rerouting system 600 may be implemented independently of the role-play module 108.

Figure 7:
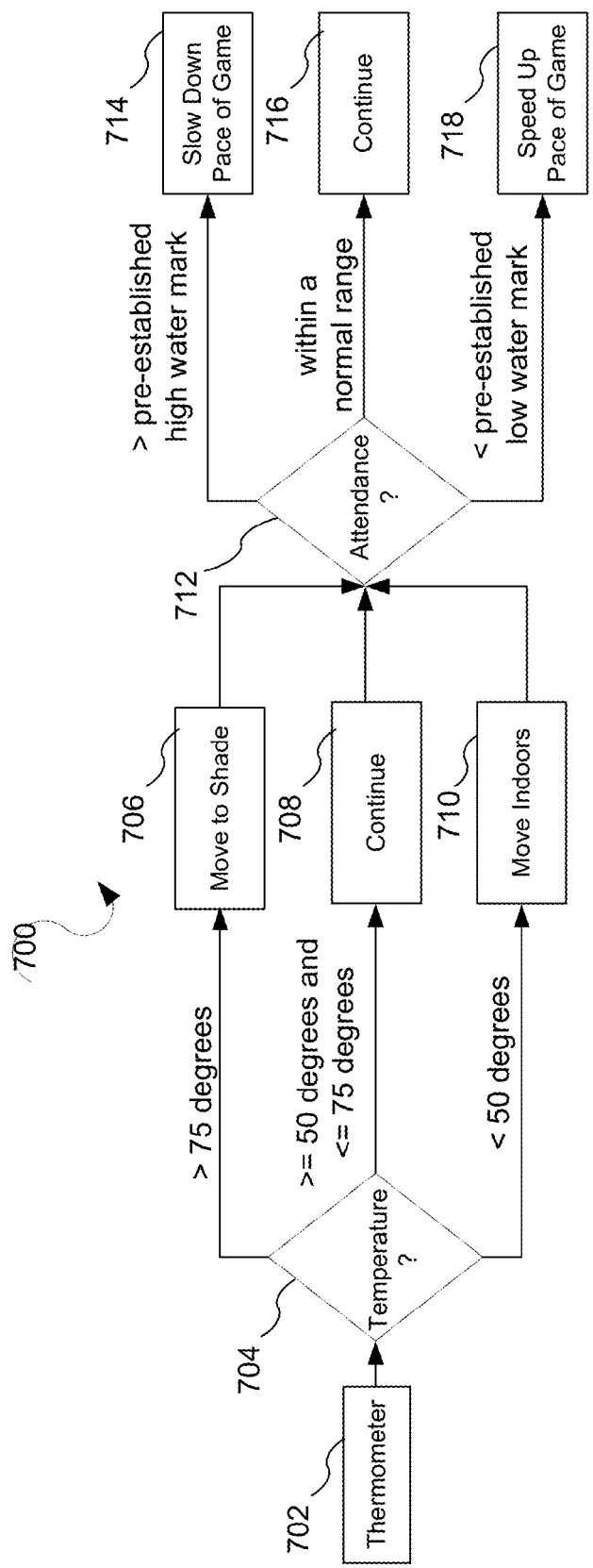
FIG. 7 illustrates an example of a process that is utilized by the dynamic gameplay system to perform dynamic rerouting of a game configuration.

FIG. 7 illustrates an example of a process 700 that is utilized by the dynamic gameplay system 604 to perform dynamic rerouting of a game configuration. A thermometer 702 generates a signal representing temperature at a particular location, region, or set of locations. Rerouting is performed at 704 based on the temperature signal. If the temperature is greater than seventy-five degrees, guests are moved to shade at 706. This can be accomplished for example by altering instructions given to a role-play participant such that a task is instructed to be performed under a tree or on a patio rather than in a sunny location. If the temperature is between fifty degrees and seventy-five degrees rerouting is unnecessary as the temperature is in a range for which the game was designed and so game play will continue at 708 without rerouting. When the temperature is less than fifty degrees certain activities may be rerouted from outdoor to indoors at 710.

Subsequently or in parallel rerouting decisions based attendance occur at 712. If attendance is greater than a pre-established high water mark, an action is performed at 714 to slow down the pace of the game. For example, additional game challenges may be provided at various locations so that game participants have to stop more often. When attendance is in a normal range for which the game was designed, rerouting is not necessary and game play will continue without rerouting at 716. When attendance is less than a pre-established low water mark, the pace of game play may speed up at 718 by, for example removing game challenges at various locations so that game participants have to stop less often.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or a computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a computer readable storage device having a computer readable program stored thereon, wherein the computer readable program while executing on a computer causes the computer to:
   implement a role-play module operable to monitor an external social networking platform;
   receive, at the role-play module, an indication of a role-play game task from a first player located in a physical environment where a role-play game is conducted, the role-play game task to be performed by the first player in the role-play game, the external social networking platform being external to the physical environment;
   provide the indication from the role-play module to the external social networking platform, wherein the indication is provided in a form that allows the external social networking platform to provide the indication to a second player remotely situated from the physical environment;
   using the role-play module, asynchronously receiving, from the second player, an instruction for an action to be performed during the role-play game task by the first player in the role-play game to assist the first player in completion of the role-play game task; and
   provide the instruction to the first player.

2. The computer program product of claim 1, wherein the computer is further caused to access a first social network profile corresponding to the first player and a second social network profile corresponding to the second player.

3. The computer program product of claim 1, wherein the computer is further caused to customize the role-play game based upon the first social network profile and the second social network profile.

4. The computer program product of claim 1, wherein the computer is further caused to prevent the first player from transitioning from a first game state to a second game state until the instruction is performed by the first player.

5. The computer program product of claim 1, wherein the computer is further caused to select the second player from a ranking of a plurality of candidates based upon availability of the second player candidates.

6. The computer program product of claim 5, wherein the computer is further caused to determine a mode of communication between the first player and the second player based upon at least one contextual factor.

7. The computer program product of claim 6, wherein the at least one contextual factor comprises one or more factors selected from the group consisting of location data, mobile application status, and presence in the social network.

8. The computer program product of claim 6, wherein the computer is further caused to customize the role-play game, at least in part, based on the at least one contextual factor.

9. The computer program product of claim 1, wherein the computer is further caused to reroute gameplay of the role-play game based upon an analysis of a plurality of environmental factors.

10. The computer program product of claim 1, wherein the plurality of environmental factors comprises one or more factors selected from the group consisting of attendance at the physical environment, guest flow, temperature, precipitation, external event status, and sound levels.

11. The computer program product of claim 10, wherein the plurality of external factors comprise values determined from one or more of measured values, estimated values, forecasted values, historical values, and statistically modeled values.

12. A method comprising:
receiving, with a processor, an indication of a role-play game task from a first player located in a physical environment where a role-play game is conducted, the role-play game task to be performed by the first player in the role-play game;
providing, with the processor, the indication to a second player remotely situated from the physical environment;
asynchronously receiving, with the processor, from the second player, an instruction for an action to be performed during the role-play game task by the first player in the role-play game to assist the first player in completion of the role-play game task; and
providing, with the processor, the instruction to the first player.

13. The method of claim 12, further comprising accessing a first social network profile corresponding to the first player and a second social network profile corresponding to the second player.

14. The method of claim 12, further comprising customizing the role-play game based upon the first social network profile and the second social network profile.

15. The method of claim 12, further comprising preventing the first player from transitioning from a first game state to a second game state until the instruction is performed by the first player.

16. The method of claim 12, further comprising selecting the second player from a ranking of a plurality of friends of the first player in the social network based upon availability.

17. The method of claim 16, further comprising determining a mode of communication between the first player and the second player based upon at least one contextual factor.

18. The method of claim 17, wherein the at least one contextual factor is location data.

19. The method of claim 17, wherein the at least one contextual factor is mobile application status.

20. The method of claim 17, wherein the at least one contextual factor is an indication of presence in the social network.

21. The method of claim 12, further comprising customizing the role-play game, at least in part, based on the at least one contextual factor.

22. The method of claim 12, further comprising rerouting gameplay of the role-play game based upon a ranking of a plurality of external factors.

23. The method of claim 12, wherein the plurality of external factors includes park attendance.

24. The method of claim 12, wherein the plurality of external factors includes guest flow in the physical environment.

25. The method of claim 12, wherein the plurality of external factors includes temperature.

26. The method of claim 12, wherein the plurality of external factors includes precipitation.

27. The method of claim 12, wherein the plurality of external factors includes event status in the physical environment.

28. The method of claim 12, wherein the plurality of external factors includes a plurality of audio levels in the physical environment.

29. A system comprising:
a processor configured to receive, at a role-play module that monitors a social networking platform, an indication of a role-play game task from a first player located in a physical environment where a role-play game is conducted, provide the indication from the role-play module to the social networking platform such that the social networking platform provides the indication to a second player remotely situated from the physical environment, asynchronously receive, from the second player at the role-play module, an instruction for an action to be performed during the role-play game task by the first player in the role-play game to assist the first player in completion of the role-play game task, and provide the instruction to the social networking platform such that the social networking platform provides the instruction to the first player, the role-play game task to be performed by the first player in the role-play game.

30. A computer program product comprising a computer readable storage device having a computer readable program stored thereon, wherein the computer readable program while executing on a computer causes the computer to:
monitor a social network platform;
receive, at a role-play module that monitors a social networking platform, an indication of a role-play game task from a first player located in a physical environment where a role-play game is conducted, the first player having a first role in the role-play game;
provide the indication from the role-play module to the social networking platform such that the social networking platform provides the indication to a second player remotely situated from the physical environment, the second player having a second role in the role-play game;
asynchronously receive, from the second player, an instruction for an action to be performed during the role-play game task by the first player in the role-play game to assist the first player in completion of the role-play game task; and
provide the instruction to the social networking platform such that the social networking platform provides the instruction to the first player.

* * * * *